United States Patent
Engel et al.

(10) Patent No.: US 7,245,093 B2
(45) Date of Patent: Jul. 17, 2007

(54) TURN-ON INTERLOCK FOR PROPELLING A VEHICLE, IN PARTICULAR A MAGNETIC LEVITATION TRAIN, ALONG A TRACK AND A DRIVE WITH A CORRESPONDING TURN-ON INTERLOCK

(75) Inventors: Markus Engel, Nürnberg (DE); Wolfgang Schacherl, Fürth (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/382,390

(22) Filed: May 9, 2006

(65) Prior Publication Data

US 2006/0261762 A1  Nov. 23, 2006

(30) Foreign Application Priority Data

May 20, 2005  (DE) ...................... 10 2005 024 309

(51) Int. Cl.
*B61L 19/14* (2006.01)
(52) U.S. Cl. ...................... 318/135; 246/131
(58) Field of Classification Search ................ 318/135; 104/281, 284; 246/131–133, 146, 314, 358, 246/415 R
See application file for complete search history.

(56) References Cited

U.S. PATENT DOCUMENTS

| | | | | |
|---|---|---|---|---|
| 4,066,228 A | * | 1/1978 | Elder | ............................ 346/5 |
| 4,348,618 A | * | 9/1982 | Nakamura et al. | ............. 318/38 |
| 4,361,095 A | * | 11/1982 | Gibson | ........................ 104/292 |
| 5,053,654 A | * | 10/1991 | Augsburger et al. | ........... 310/12 |
| 5,136,217 A | | 8/1992 | Hoffmann et al. | |
| 6,411,049 B1 | * | 6/2002 | Fischperer | .................... 318/38 |
| 6,753,666 B2 | * | 6/2004 | Fischperer | .................. 318/135 |

FOREIGN PATENT DOCUMENTS

| | | |
|---|---|---|
| DE | 29 31 065 A1 | 2/1981 |
| DE | 40 14 848 A1 | 11/1991 |

* cited by examiner

*Primary Examiner*—Bentsu Ro
(74) *Attorney, Agent, or Firm*—Henry M. Feiereisen

(57) ABSTRACT

A turn-on interlock for propelling a vehicle, in particular a magnetic levitation train (maglev), along a track is disclosed, as well as a drive incorporating the turn-on interlock. A stator of a linear motor forming the drive and extending along the track is divided into a plurality of stator sections which can be sequentially connected to an electric power source for propelling the vehicle. Each stator section has one or more feed switches for connecting the stator section to an electric power source, and signaling elements ganged with the feed switches. The turn-on interlock prevents more than one stator section from being connected to the power source at any given time. A stator section can only be connected if all signaling elements or all signaling elements of at least a predetermined subset of the signaling elements indicate an "open" switching state of the feed switch.

16 Claims, 1 Drawing Sheet

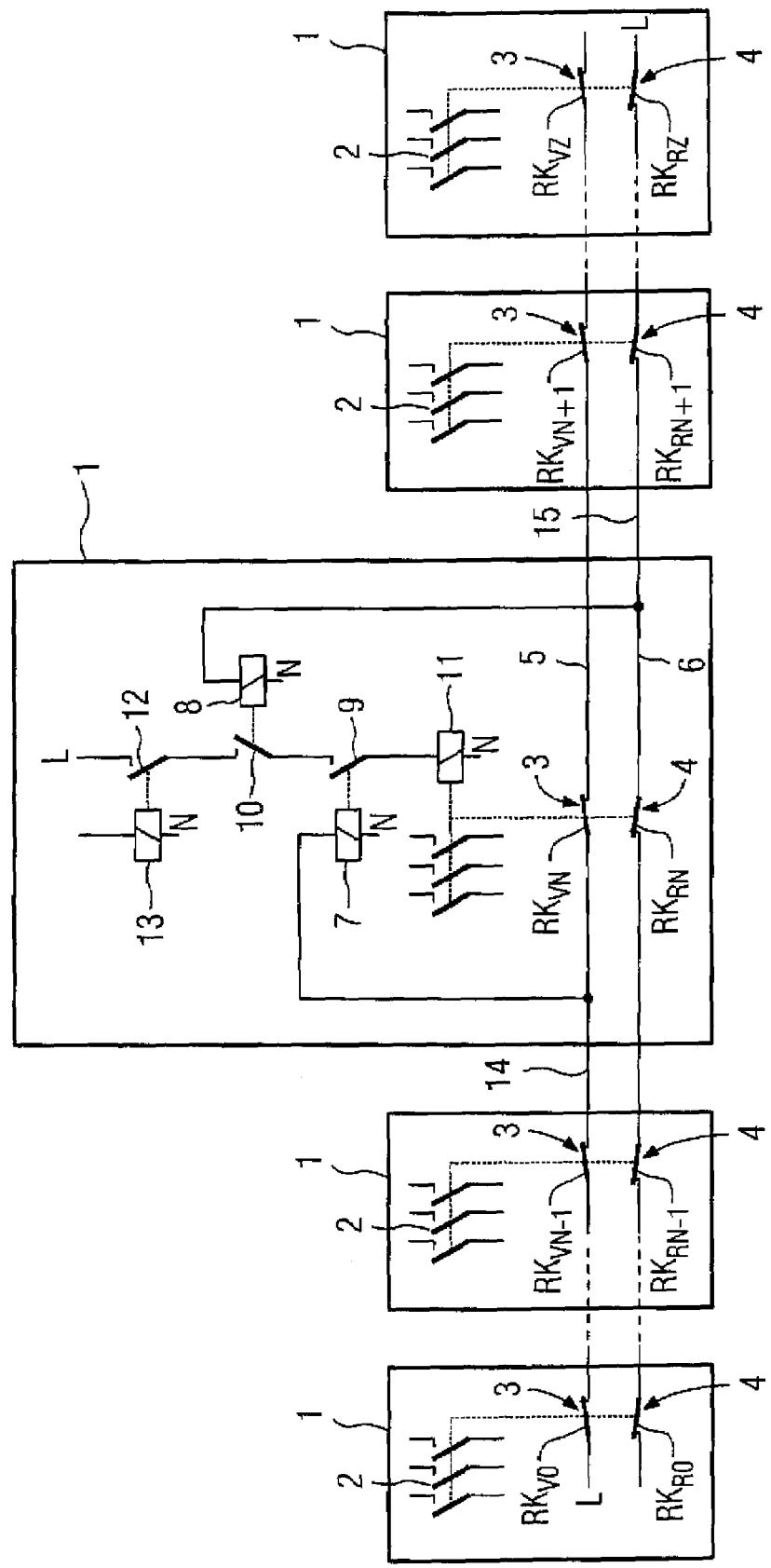

TURN-ON INTERLOCK FOR PROPELLING A VEHICLE, IN PARTICULAR A MAGNETIC LEVITATION TRAIN, ALONG A TRACK AND A DRIVE WITH A CORRESPONDING TURN-ON INTERLOCK

CROSS-REFERENCES TO RELATED APPLICATIONS

This application claims the priority of German Patent Application, Serial No. 10 2005 024 309.6, filed May 20, 2005, pursuant to 35 U.S.C. 119(a)-(d), the content of which is incorporated herein by reference.

BACKGROUND OF THE INVENTION

The invention is directed to a turn-on interlock for propelling a vehicle, in particular a magnetic levitation train, along a track, and further to a drive with a corresponding turn-on interlock.

Nothing in the following discussion of the state of the art is to be construed as an admission of prior art.

Drives for magnetic levitation trains, also referred to as maglev, are known in the art. Such drives include a linear motor with a stator extending along the track. The stator is divided into stator sections which are sequentially connected to an electric power source to propel the magnetic levitation train. Each stator section includes a feed switch which provides the connection to the power source. To decrease the permissible distance between trains, the sections can overlap so that under certain conditions two magnetic levitation trains can operate within a single drive or operation management section. However, this can disadvantageously cause undesirable interferences, if two stator sections, on which simultaneously two magnetic levitation trains are located, are simultaneously switched on. This can cause the magnetic levitation trains to drop to one side, which may prevent the trains from reaching their next stop. These situations should therefore be prevented or should occur only with a low probability. Suitable software can be installed to prevent several stator sections from being switched on simultaneously. However, the reliability that can be achieved in this way is still insufficient.

It would therefore be desirable and advantageous to provide an improved interlock device and associated drive with such interlock for a magnetic levitation vehicle, in particular a maglev train, moving along a track which obviates prior art shortcomings and is able to specifically prevent more than one stator section of a linear motor propelling the vehicle to be switched on simultaneously.

SUMMARY OF THE INVENTION

According to one aspect of the invention, a turn-on interlock for a drive propels a vehicle, in particular a magnetic levitation train, along a track. The drive includes a linear motor with a stator, which is divided into a plurality of stator sections for sequential connection to an electric power source. The turn-on interlock includes a plurality of feed switches associated in one-to-one correspondence with the stator sections to connect, when activated, the stator sections to the electric power source, and a plurality of signaling elements operatively connected with the feed switches and configured to indicate an "open" switching state of the feed switches when the feed switches are deactivated. A selected stator section is connected with the power source only if at least a predetermined subset of the signaling elements located before and after the selected stator section indicate an "open" switching state. The predetermined subset may include at least one signaling element before and at least one signaling element after the selected stator section.

According to another aspect of the invention, instead of only a predetermined subset of the signaling elements located before and after the selected stator section indicating an "open" switching state, all the signaling elements located before and after the selected stator section could indicate an "open" switching state.

According to still another aspect of the present invention, a drive for a vehicle, in particular a magnetic levitation train, moving along a track includes a linear motor with a stator divided into a plurality of stator sections for sequential connection to an electric power source, and a plurality of feed switches associated in one-to-one correspondence with the stator sections to connect, when activated, the stator sections to the electric power source. The drive further includes a plurality of signaling elements operatively connected with the feed switches and configured to indicate an "open" switching state of the feed switches when the feed switches are deactivated. A selected stator section is connected with the power source only if all signaling elements of at least a predetermined subset of the signaling elements located before and after the selected stator section indicate an "open" switching state.

According to another feature of the present invention, the signaling elements signal switches may be switched when the connected feed switch is activated and deactivated.

To improve the reliability, the signal switches can be ganged with the feed switches so as to be switched together with the feed switches. A signal switch can advantageously be formed as a break (normally-open) switch to indicate an "open" switching state when a feed switch is activated and therefore closed.

The turn-on interlock can be made safer by providing each of the plurality of feed switches with a first signal switch and a second signal switch. The first signal switches of the plurality of feed switches are arranged in a first contact row and connected in series commensurate with a sequential order of the stator sections, whereas the second signal switches of the plurality of feed switches are arranged in a second contact row and connected in series commensurate with a sequential order of the stator sections. The feed switch of the selected stator section is activated only if all signal switches of at least the predetermined subset of the signal switches in the first contact row located to one side of the signal switch of the selected stator section are closed, and if at the same time all signal switches of at least the predetermined subset of the signal switches in the second contact row located to the opposite side of the signal switch of the selected stator section are also closed.

The switching states can be more readily verified by connecting all signal switches located in the first contact row to one side the signal switch and all signal switches located in the second contact row on an opposite side the signal switch associated with this feed switch to a power supply.

According to another feature of the present invention, the live voltage of the power supply may be supplied by the first signal switch to an actuator of a first relay having a make contact, and the live voltage from the power supply may be supplied by the second signal switch to actuator of a second relay having also a make contact, wherein the two make contacts may be connected in series so that the feed switch is actuated only if the two make contacts are closed simultaneously. At least one first signal switch of the predetermined subset of the signal switches located in the first contact row and at least one second signal switch of the predetermined subset of the signal switches located in the second contact row may hereby each connected to a live terminal of a power supply.

According to another feature of the present invention, the interlock may include a control switch having a make contact which is connected in series with the two series-connected make contacts. Each feed switch is implemented as a contactor having an actuator winding. The actuator winding is connected to the power supply only if the make contact of the control switch and the two series-connected make contacts of the relays are closed simultaneously.

To transmit the signals over larger distances, the first and second contact rows advantageously include optical signal connections, whereby the optical signals are converted into electrical signals for controlling the first and second relays and their associated make contacts.

The interlock and drive can be operated more reliably by implementing the first and second contact rows each as an independent ring topology, with each ring topology including a control unit for signal transmission. The two independent ring topologies can be combined into a single ring topology if one of the control units malfunctions.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a circuit diagram of a turn-on interlock implemented as a hardware contactor interlock in accordance with the present invention.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the only FIGURE, there is shown a turn-on interlock as part of a drive (not shown) to propel a vehicle, such as a magnetic levitation train, along a track. Such drives include a linear motor with a stator extending along the track. The stator is divided into stator sections which are sequentially connected with a three-phase electric power supply for propelling the vehicle. In the FIGURE, the live conductor of the power supply of the turn-on interlock has the reference symbol L and the ground conductor has the reference symbol N.

The FIGURE shows the switching locations 1 associated with the various stator sections. Each switching location 1 includes a feed switch 2 implemented as a contactor which, when activated, connects the associated stator section with the power source. Two signaling elements 3, 4 are associated with each feed switch. The signaling elements 3, 4 are here formed as signal switches RKV, RKR (representing feedback contacts which indicate the switching state of the feed switch 2) and are ganged with, or compulsory-guided with, the feed switch 2 so that they are switched together with the feed switch 2. The signal switches RKV, RKR are consecutively numbered in the FIGURE from left (0) to right (Z), i.e. RKV,0, . . . , RKVN−1, RKVN, RKVN+1, . . . , RKVZ, and RKR,0, . . . , RKRN−1, RKRN, RKRN+1, . . . , RKRZ. The signal switches RKV, RKR are break contacts, i.e., they indicate the switching state "open" when the associated feed switch 2 is activated, i.e., closed.

As indicated in the FIGURE, the signal switches RKV, RKR are connected in series in the order of the stator sections along the track, forming two contact rows 5, 6. The contact row with the reference symbol 5 is formed by the series-connected signal switches RKV, and the contact row with the reference symbol 6 is formed by the series-connected signal switches RKR. As indicated in the FIGURE, the two contact rows 5, 6 are connected to the power source L at opposite ends, i.e., at their respective left and the right ends in the FIGURE.

The switching location 1 is illustrated in the center of the FIGURE in an enlarged scale, showing additional details of the switching locations 1. For example, each switching location 1 includes two relays 7, 8, wherein one of the relays, relay 7, is connected with the contact row 5 and the other relay 8 is connected with the contact row 6. The relay switches 9, 10 associated with the relays 7, 8 are connected in series and are also connected to the ground conductor N of the power source via the actuator winding 11 of the feed switch 2, which is formed as a contactor. An additional control switch 12, which is connected with the live conductor L, is also connected in series. The control switch 12 is part of a controller, of witch only a relay actuator 13 is shown in the FIGURE. The control switch 12 is a relay switch or contact associated with the relay actuator 13.

As indicated in the FIGURE, the stator section associated with the center switching location 1 is connected by activating the relay actuator 13 of the controller. Upon activation, the control switch 12 closes, allowing current to flow through the actuator winding 11 of the feed switch 2 only if also the two relay switches 9, 10 are also closed. For this to occur, the actuators of relays 7 and 8 must be energized, i.e., the signal switches RKV,0, . . . , RKVN−1, shown in the FIGURE from left to right and located before the signal switch RKVN, as well as the signal switches RKRN+1, . . . , RKRZ, shown in the FIGURE from left to right and located after the signal switch RKRN, must also be closed. This information is coupled into the control path via the relay switches 9, 10. It will be understood that to close the two relay switches 9, 10 all signal switches can be closed, but not all signal switches need not be closed. Instead, it is sufficient that a subset of the signal switches, for example, at least the signal switches located directly to the left and to the right of the two signal switches RKV, RKR are closed. This would "signal" to the respective signal switch RKV, RKR that the feed switch located immediately before and immediately after the respective switching location 1 has the switching state "open." The predefined signal switches are here the signal switches RKV, RKR located to the left (left: RKV,0, . . . , RKVN−1) and to the right (right: RKRN+1, . . . , RKRZ) of the two signal switches RKV, RKR. The subset of switches is defined by the type of connection (connection with the power source L to opposing ends). Stated differently, the signal "No switch turned on in the forward direction" is present at the location indicated with the reference symbol 14, and this signal can be evaluated. The signal "No switch turned on in the backward direction" is present at the location indicated with the reference symbol 15 (the forward and backward directions are defined in relation to L).

Because the mechanical signal switches RKV, RKR are ganged, the aforedescribed connection ensures that only a single stator section of the motor system is connected with the power source at one time.

The signals from the signal switches RKV, RKR can also be transmitted optically. For example, the two contact rows can include optical signal links, whereby the electric signals are first converted into optical signals and then back to electrical signals for controlling the two relay switches 9, 10. The switching state is also converted into an optical signal and transmitted in this way. The two contact rows may be implemented as a ring topology and may include a controller for signal transmission. The two independent ring topologies may be combined into a single ring topology in the event that a controller malfunctions or fails. This embodiment provides a high reliability.

In a more complex embodiment, the signal switches RKV, RKR can each be connected to a bus instead of in series as contact rows 5, 6, and the ends of the two buses can be connected to central processing units. With this approach, the switching commands of the controller (relay 13) also need to be checked in addition to the feedback signals, advantageously by software modules which may operate separately from the operational control.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A turn-on interlock for a drive propelling a vehicle along a track, with the drive including a linear motor having a stator divided into a plurality of stator sections for sequential connection to an electric power source, the turn-on interlock comprising:
   a plurality of feed switches associated in one-to-one correspondence with the stator sections to connect, when activated, the stator sections to the electric power source, and
   a plurality of signaling elements operatively connected with the feed switches and configured to indicate an "open" switching state of the feed switches when the feed switches are deactivated,
   wherein a selected stator section is connected with the power source only if at least a predetermined subset of the signaling elements located before and after the selected stator section indicate an "open" switching state.

2. The turn-on interlock of claim 1, wherein the vehicle is a magnetic levitation train.

3. The turn-on interlock of claim 1, wherein the predetermined subset includes at least one signaling element before and at least one signaling element after the selected stator section.

4. The turn-on interlock of claim 1, wherein the signaling elements comprise signal switches which are switched when the connected feed switch is activated and deactivated.

5. The turn-on interlock of claim 4, wherein the signal switches are ganged with the feed switches.

6. The turn-on interlock of claim 4, wherein the signal switches are formed as break switches and indicate the "open" switching state if the feed switches are activated and therefore closed.

7. The turn-on interlock of claim 1, wherein each of the plurality of feed switches includes a first signal switch and a second signal switch, wherein the first signal switches of the plurality of feed switches are arranged in a first contact row and connected in series commensurate with a sequential order of the stator sections, and wherein the second signal switches of the plurality of feed switches are arranged in a second contact row and connected in series commensurate with a sequential order of the stator sections, wherein the feed switch of the selected stator section is activated only if all signal switches of at least the predetermined subset of the signal switches in the first contact row located to one side of the signal switch of the selected stator section are closed, and if at the same time all signal switches of at least the predetermined subset of the signal switches in the second contact row located to the opposite side of the signal switch of the selected stator section are also closed.

8. The turn-on interlock of claim 7, wherein at least one first signal switch of the predetermined subset of the signal switches located in the first contact row and at least one second signal switch of the predetermined subset of the signal switches located in the second contact row are each connected to a live terminal of a power supply.

9. The turn-on interlock of claim 8, wherein the live voltage from the power supply is supplied by the first signal switch to an actuator of a first relay having a make contact, and the live voltage from the power supply is also supplied by the second signal switch to an actuator of a second relay having a make contact, wherein the make contacts are connected in series so that the feed switch of the selected stator section is actuated only if the two make contacts are both closed.

10. The turn-on interlock of claim 9, further comprising a control switch having a make contact connected in series with the two series-connected make contacts of the first and second relays, wherein each feed switch is implemented as a contactor having an actuator winding, with the actuator winding being connected to the power supply only if the make contact of the control switch and the two series-connected make contacts of the first and second relays are closed simultaneously.

11. The turn-on interlock of claim 7, wherein the first and second signal switches comprise optical switches transmitting optical signals to indicate the "open" switching state of the feed switches.

12. The turn-on interlock of claim 11, wherein the optical signals are converted into electrical signals, and wherein a converted electrical signal from the first signal switch is supplied to an actuator of a first relay having a make contact, and a converted electrical signal from the second signal switch is supplied to an actuator of a second relay having a make contact, wherein the make contacts are connected in series so that the feed switch of the selected stator section is actuated only if the two make contacts are both closed.

13. The turn-on interlock of claim 11, wherein the first and second contact rows are each implemented as an independent ring topology, with each ring topology including a control unit for signal transmission, and wherein the two independent ring topologies are combined into a single ring topology in the event of a failure of one of the control units.

14. A turn-on interlock for a drive propelling a vehicle along a track, with the drive including a linear motor having a stator divided into a plurality of stator sections for sequential connection to an electric power source, the turn-on interlock comprising:
- a plurality of feed switches associated in one-to-one correspondence with the stator sections to connect, when activated, the stator sections to the electric power source, and
- a plurality of signaling elements operatively connected with the feed switches and configured to indicate an "open" switching state of the feed switches when the feed switches are deactivated,
- wherein a selected stator section is connected with the power source only if all signaling elements located before and after the selected stator section indicate an "open" switching state.

15. A drive for a vehicle moving along a track comprising:
- a linear motor having a stator divided into a plurality of stator sections for sequential connection to an electric power source,
- a plurality of feed switches associated in one-to-one correspondence with the stator sections to connect, when activated, the stator sections to the electric power source, and
- a plurality of signaling elements operatively connected with the feed switches and configured to indicate an "open" switching state of the feed switches when the feed switches are deactivated,
- wherein a selected stator section is connected with the power source only if all signaling elements of at least a predetermined subset of the signaling elements located before and after the selected stator section indicate an "open" switching state.

16. The drive of claim 15, wherein the vehicle is a magnetic levitation train.

* * * * *